(12) United States Patent
Lodhie et al.

(10) Patent No.: US 6,507,290 B1
(45) Date of Patent: Jan. 14, 2003

(54) LIGHT EMITTING DIODE CLUSTER MODULE CAPABLE FOR USE AS AN AIRCRAFT FORWARD POSITION LIGHT SOURCE

(75) Inventors: Pervaiz Lodhie, Rolling Hills; Steven R. Becerra, San Pedro, both of CA (US)

(73) Assignee: Ledtronics, Inc., Torrance, CA (US)

( * ) Notice: Subject to any disclaimer, the term of this patent is extended or adjusted under 35 U.S.C. 154(b) by 0 days.

(21) Appl. No.: 09/531,853

(22) Filed: Mar. 21, 2000

(51) Int. Cl.[7] ............................................... B64D 47/06
(52) U.S. Cl. ...................... 340/981; 244/1 R; 340/982; 362/470
(58) Field of Search ................................. 340/981, 982; 244/1 R; 362/470

(56) References Cited

U.S. PATENT DOCUMENTS

| | | | | |
|---|---|---|---|---|
| 5,585,783 A | * | 12/1996 | Hall | 340/473 |
| 5,710,560 A | * | 1/1998 | Cohn | 340/982 |
| 5,793,164 A | * | 8/1998 | Authier | 315/300 |
| 5,929,788 A | * | 7/1999 | Vukosic | 340/981 |
| 5,984,494 A | * | 11/1999 | Chapman et al. | 362/470 |
| 6,011,493 A | * | 1/2000 | Bushell et al. | 340/981 |

* cited by examiner

Primary Examiner—Brent A. Swarthout
(74) Attorney, Agent, or Firm—Eric Karich

(57) ABSTRACT

A light source in the form of a light emitting diode (LED) cluster module suitable for use as an aircraft forward position light source. The light source comprises multiple LED components mounted on a base structure together with supporting electronic components to regulate the function of the LED components. The LED components are configured on the base structure in a manner so as to be capable of complying with the Federal Aviation Regulations minimum light intensities or candela requirements and color specifications while in a preferred implementation using a traditional aircraft 28-volt power supply. Furthermore, the preferred implementations are capable of meeting stringent dimensional design criteria and therefore are suitably adaptable as replacement light sources for existing aircraft forward position light housings.

69 Claims, 10 Drawing Sheets

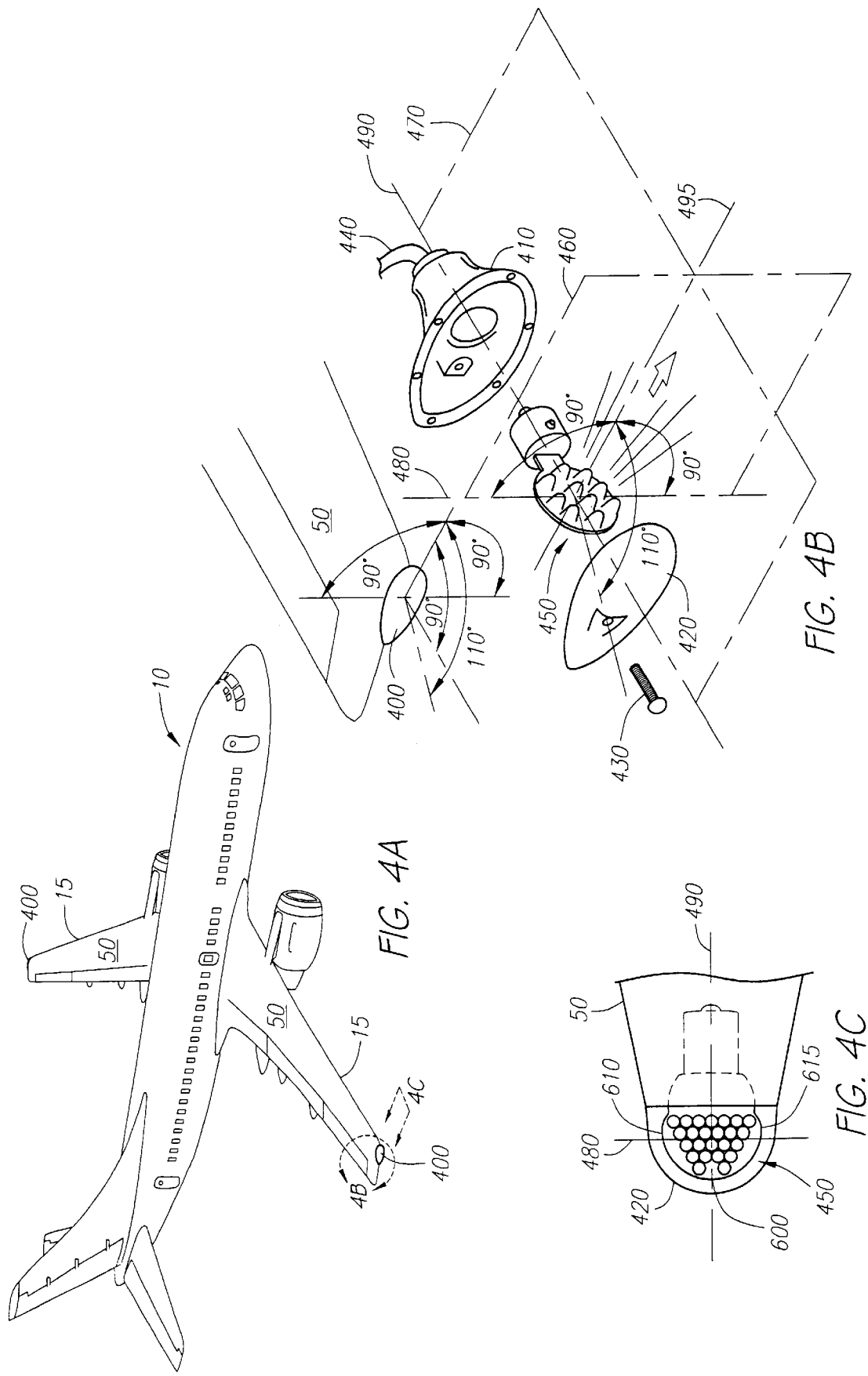

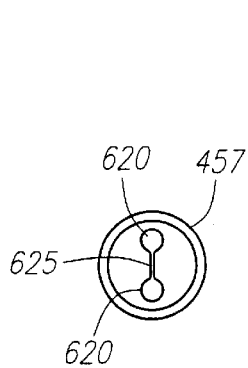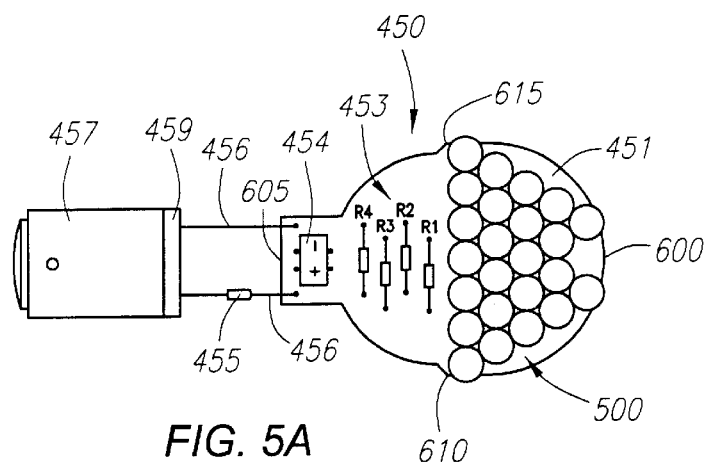
FIG. 5B  FIG. 5A
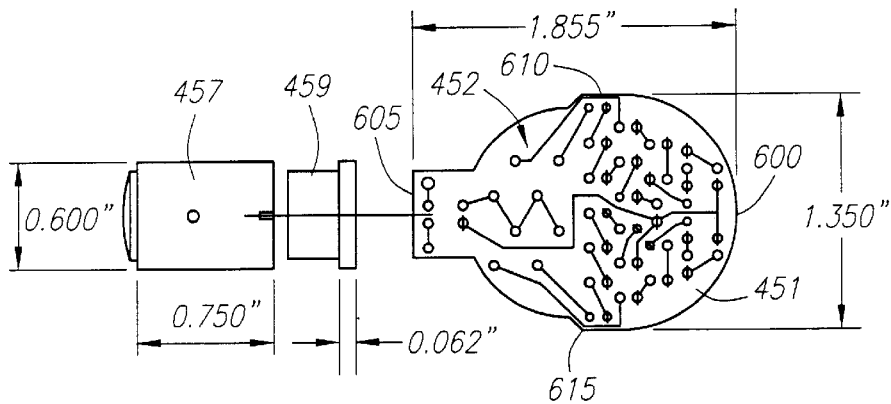
FIG. 5C
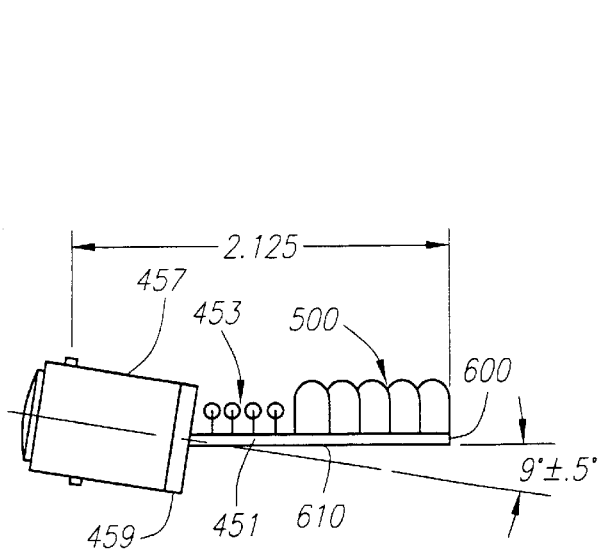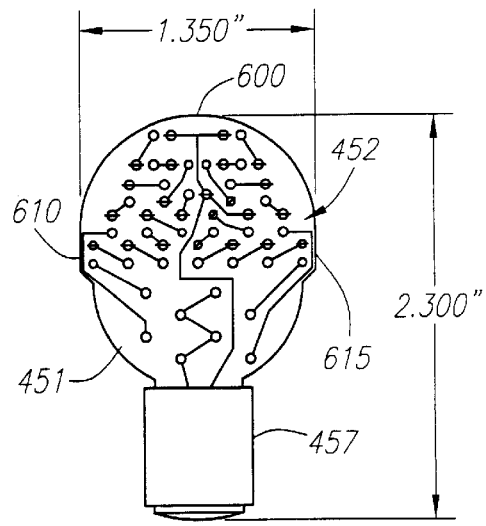
FIG. 5D  FIG. 5E

LIGHT EMITTING DIODE CLUSTER MODULE CAPABLE FOR USE AS AN AIRCRAFT FORWARD POSITION LIGHT SOURCE

The field of the present invention relates generally to light sources.

BACKGROUND OF THE INVENTION

An aircraft is required by law to have forward position lights, including a green light on the starboard side or right side of the aircraft and a red light on the port or left side of the aircraft. The lights are typically positioned at the leading edge of each of the aircraft's wings apart laterally from one another as far apart as practicable. Their function is to enable observers of the aircraft to determine the position and orientation of the aircraft and the direction in which it is traveling.

Forward position lights are subject to strict requirements or standards defined in the Federal Aviation Regulations which can be found in Title 14 Subchapter C of the United States Code of Federal Regulations, which is hereby incorporated by reference. Section 25.1381 through section 25.1397 of Part 25 of Subchapter C is attached to this application as Attachment A. In part, these regulations require that each aircraft forward position light comply with minimum candela (cd) outputs while maintaining defined chromaticity or color quality. In addition, the regulations require the light sources to comply with certain structural integrity criteria including criteria relating to shock, shear load, vibration, leakage and surface temperature. Industry standards for aircraft design have exacted additional design limitations. For example, traditionally aircraft design has dictated a 28-volt power supply to power the aircraft forward position lights. In addition, with respect to replacement light sources, consideration must be made of the further limitations imposed by the existing design envelopes (i.e., dimensional considerations). Moreover, it is generally advantageous that the light source be as compact in design as possible so that it may be mounted at the leading edges of the wing tips without imposing a burden to the aerodynamics of the aircraft.

Presently, specially designed incandescent light bulbs are employed as light sources for aircraft forward position lights. While the technology underlying the use of incandescent lights is familiar, there are a number of shortcomings that make their use in this application less than ideal. For example, the incandescent light sources adapted for this use are presently understood to typically have a life expectancy of 2,500 to 5,000 operating hours. After which time they must be replaced, thereby, incurring maintenance costs related to labor, replacement parts, and inventory overhead and storage.

In addition, incandescent light sources emit white or polychromatic light. As such, to achieve the required color quality for use as an aircraft position light, specially designed colored lenses are needed to filter the polychromatic light to the required chromaticity or color quality. Thus, wasted power is expended in the emission of unusable light, which consequently increases the probability of heat damage to the surrounding components and housing structure.

Furthermore, it is presently understood that incandescent light sources traditionally employ a single lighting filament or alternatively multiple lighting filaments electrically connected in series. Consequently, the failure of any one filament results in the complete failure of the light source. Such an all-out failure may result in a reduced level of safety in the airways, especially if the failure of the light source occurs in mid-flight when replacement of the light source is not possible.

Therefore, it is desirable to provide a light source that overcomes one or more of the foregoing shortcomings more successfully than those known in the art while maintaining or exceeding the standards imposed by law.

SUMMARY OF THE INVENTION

The present invention relates in one aspect to the light emitting diode (LED) clusters suitable for use as aircraft forward position light sources.

According to one aspect as described herein, the aircraft forward position light source comprises, a base structure, and multiple LED components mounted on a defined region of the base structure, and adapted so that, when powered, the LED components emit light that meets the candela output design criteria defined in Table 1 and Table 2 and the Federal Aviation chromaticity requirements for the light source.

According to another aspect, the aircraft forward position light source comprises a base structure, electrical circuitry adapted to be connected to a power supply, and at least four sets of LED components mounted on a defined region of the base structure and in electrical communication with the electrical circuitry with a first LED component set being oriented at a first defined angle distally relative normal, a second LED component set being oriented substantially normal, a third LED component set being oriented at a third defined angle downwardly relative to normal, and a fourth LED component set being oriented at a fourth defined angle upwardly relative to normal such that, when powered the LED components emit light that meets the candela output design criteria defined in Table 1 and Table 2.

According to yet another aspect as described herein, the aircraft forward position light source comprises multiple LED components adapted to being in full compliance with both the candela output design criteria defined in Table 1 and Table 2 and the Federal Aviation chromaticity requirements for the light source, the LED components being further adapted to fall within the confines of a defined area of approximately 2.75 inches by 2.00 inches.

Additional implementations, features, variations and advantages of the invention will be set forth in the description that follows, and will be further evident from the illustrations set forth in the accompanying drawings.

BRIEF DESCRIPTION OF THE DRAWINGS

The accompanying drawings illustrate certain design criteria and presently preferred implementations of the invention and, together with the description, serve to explain various principles of the invention.

FIG. 4A is an illustration of a perspective view of an aircraft showing with the typical aircraft forward position lights on the leading edge of each wing of the aircraft.

FIG. 4B is a more detailed illustration of an exploded perspective view of the aircraft forward position light depicted in FIG. 4A in accordance with a preferred implementation.

FIG. 4C is an illustration of the component or front side view of the aircraft forward position light in accordance with the preferred implementation depicted in FIG. 4B.

FIG. 5A is an illustration of a partially exploded component or front side view of a preferred implementation of a light emitting diode cluster module.

FIG. 5B is an illustration of the proximate side view of the base element of the preferred implementation of the light emitting diode cluster module depicted in FIG. 5A.

FIG. 5C is an illustration of a partially exploded solder or rear side view of the preferred implementation of the light emitting diode cluster module depicted in FIG. 5A.

FIG. 5D is an illustration of a top side view of the assembled preferred implementation of the light emitting diode cluster module depicted in FIG. 5A.

FIG. 5E is an illustration of a solder or rear side view of the assembled preferred implementation of the light emitting diode cluster module depicted in FIG. 5A absent the sleeve element.

DETAILED DESCRIPTION OF THE PREFERRED IMPLEMENTATIONS

Reference will now be made to the construction and operation of preferred implementations of the present invention, including design criteria therefore, examples of which are illustrated in the accompanying drawings. The following description of preferred implementations of the present invention is only exemplary of the invention. The present invention is not limited to these implementations, but may be realized by other implementations.

Figure 1A:
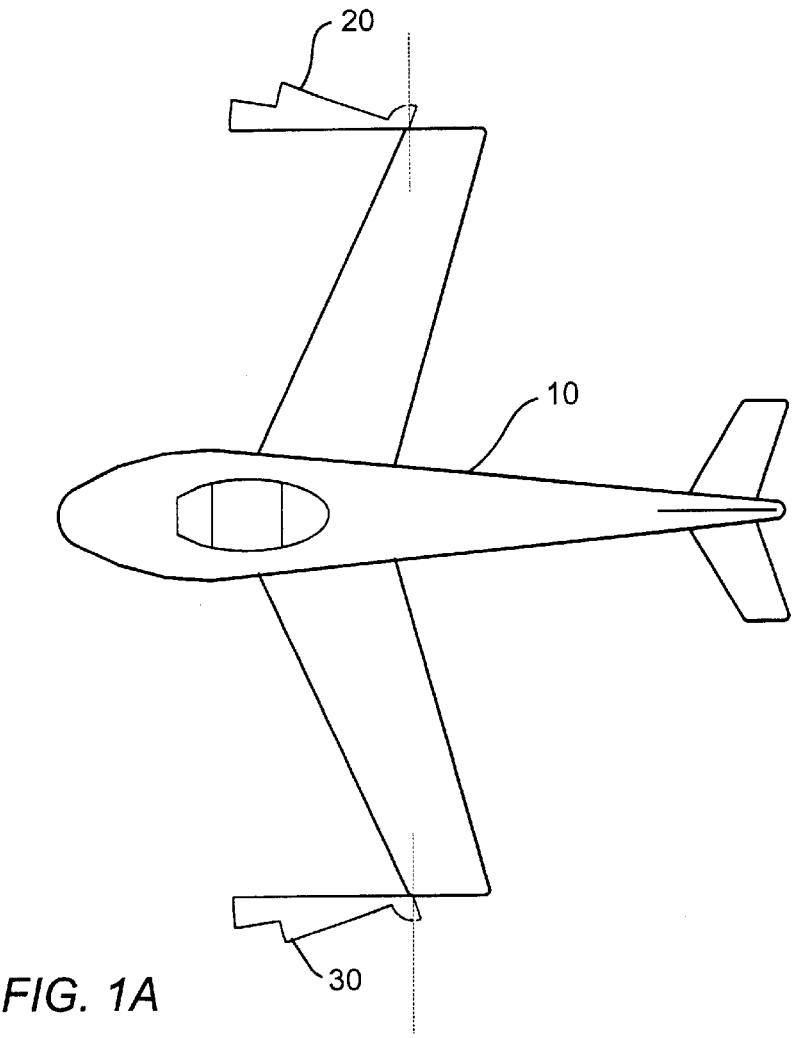
FIG. 1A is an illustration of a top view of an aircraft with two graphs, positioned at each of the aircraft forward position light sources, illustrating candela output design criteria for measurements taken in the horizontal plane.
Figure 2A:
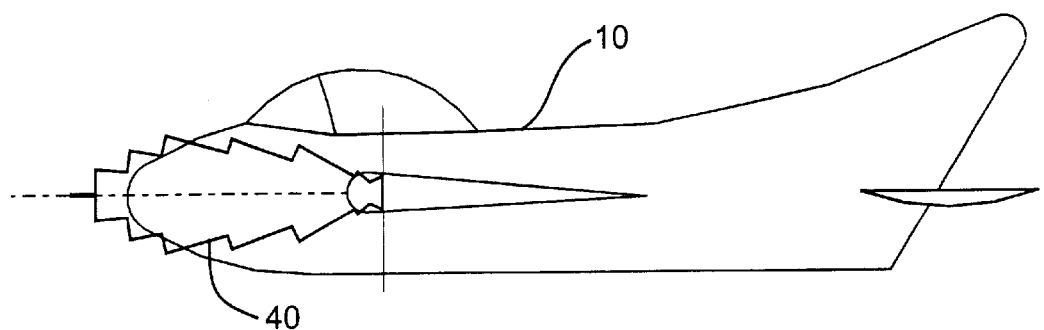
FIG. 2A is an illustration of a port side view of an aircraft with a graph positioned at the port side aircraft forward position light source illustrating candela output design criteria for measurements taken in the vertical plane.

FIG. 1A is an illustration of a top view of an aircraft 10 with graphs 20 and 30 positioned at the aircraft forward position light sources. Graphs 20 and 30 illustrate candela output design criteria for measurements taken along defined angle ranges in the horizontal plane. FIG. 2A is an illustration of a port side view of the aircraft 10 with graph 40 positioned at the port side aircraft forward position light source. Graph 40 illustrates candela output design criteria for measurements taken in the vertical plane for both the starboard and port side aircraft position lights 400 (shown in FIG. 4A).

Figure 1B:
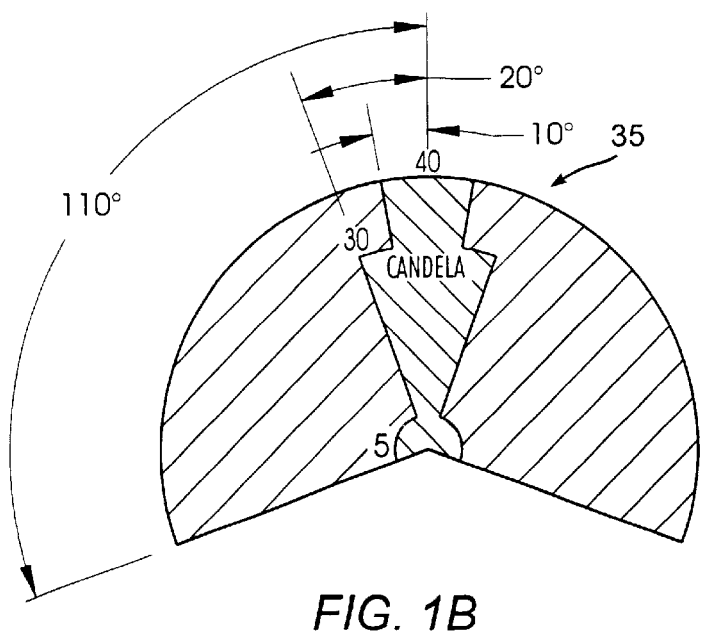
FIG. 1B is a more detailed illustration of the two graphs in FIG. 1A depicted as a single consolidated graph.

FIG. 1B is a more detailed illustration of graphs 20 and 30 in FIG. 1A depicted as a single consolidated graph called out as reference numeral 35. The consolidated graph 35 illustrates candela output design criteria for measurements in the horizontal plane. The "horizontal plane" is defined as the plane containing a longitudinal axis of the aircraft and perpendicular to the plane of symmetry of the aircraft. The plane is depicted in relation to the light source in FIG. 4B (reference numeral 470). The candela output design criteria in the horizontal plane as set forth in consolidated graph 35 are presented in the following Table 1.

TABLE 1

Candela Output Design Criteria in the Horizontal Plane

| Dihedral Angle | Minimum Candela (cd) |
|---|---|
| 0 to 10 degrees | 40 cd |
| 10 to 20 degrees | 30 cd |
| 20 to 110 degrees | 5 cd |

Figure 2B:
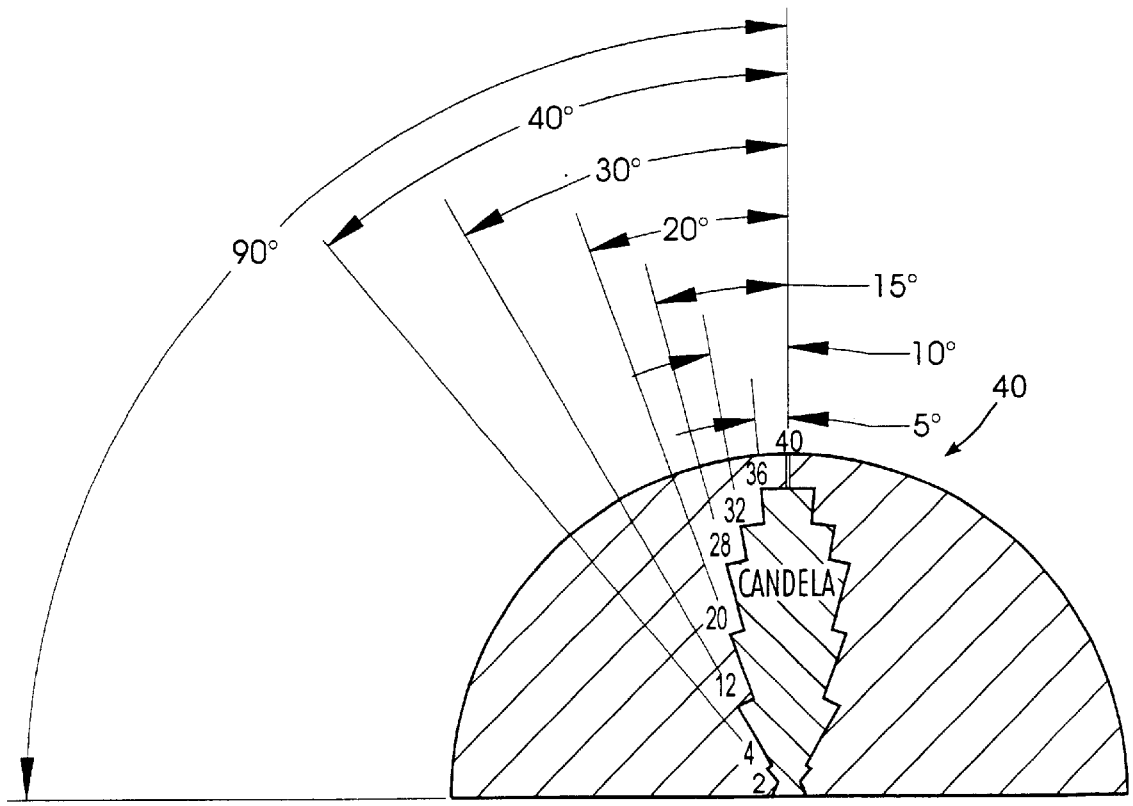
FIG. 2B is a more detailed illustration of the graph depicted in FIG. 2A.

FIG. 2B is a more detailed illustration of graph 40 depicted in FIG. 2A illustrating the candela output design criteria for measurements taken in the vertical plane. A "vertical plane," in the context of candela out put design criteria, is defined as a plane perpendicular to the horizontal plane, whereas a "zero vertical plane" is defined as a vertical plane that is also perpendicular to the longitudinal axis of the aircraft (depicted in relation to the light source in FIG. 4B as reference numeral 460). The candela output design criteria in the vertical plane as set forth in graph 40 are presented in the following Table 2.

TABLE 2

Candela Output Design Criteria in the Vertical Plane

| Angle Above and Below the Horizontal Plane | Minimum Candela (cd) |
|---|---|
| 0 degrees | 40 cd |
| 0 to 5 degrees | 36 cd |
| 15 to 10 degrees | 32 cd |
| 10 to 15 degrees | 28 cd |
| 15 to 20 degrees | 20 cd |
| 20 to 30 degrees | 12 cd |
| 30 to 40 degrees | 4 cd |
| 40 to 90 degrees | 2 cd |

The candela design criteria illustrated in graphs 20, 30, 35 and 40 of FIGS. 1 and 2 and presented in the foregoing Tables 1 and 2, are applicable to both the green aircraft forward position light on the starboard side (right side) of the aircraft as well as the red aircraft forward position light on the port side (left side) of the aircraft. With respect to the starboard side position light, the "dihedral angle" is formed by two intersecting vertical planes. The zero degree vertical plane (illustrated in FIG. 4B, 460) is substantially parallel to the longitudinal axis of the aircraft. The vertical intersecting planes are positioned at the called for angle to the right of the zero degree plane as viewed when looking forward along the longitudinal axis of the aircraft. Similarly, with respect to the port side position light, the "dihedral angle" is formed by two intersecting vertical planes, however, the intersecting planes are positioned at the called for angle to the left of the zero degree plane as viewed when looking forward along the longitudinal axis of the aircraft. These angular relations of the vertical and horizontal candela design criteria are also reflected in the graphs of FIGS. 1A and 2A.

When determining whether candela design criteria are met a photometer is used. It is to be positioned 10 feet from the center of the light source. Measurements are taken substantially along the horizontal plane (470) and vertical plane (460) between the defined angular ranges (set forth in FIGS. 1B and 2B and presented in Table 1 and 2). When assessing whether the measurements meet the defined candela criteria, it is to be understood that unless otherwise specifically stated any measurement taken within the defined angular range that meets or exceeds the candela output design criteria for that range shall be considered to "meet" the criteria for that range. Thus, it is contemplated, for example, that a measurement taken in the horizontal plane at 8 degrees which is equal or greater to the candela design criteria of 40 cd is sufficient to "meet" the candela design criteria for the 0 to 10 degree range regardless of whether a measurement taken at 4 degrees fails or measures less than the 40 cd candela criteria. It is preferable, however, that all horizontal and vertical plane measurements within a specified angular range equal or exceed the candela output design criteria for that range. Thus, the term "full compliance" shall, in the context of candela design criteria, mean that at no angle within a given horizontal or vertical range shall the candela output be less than the defined design criteria.

Figure 3A:
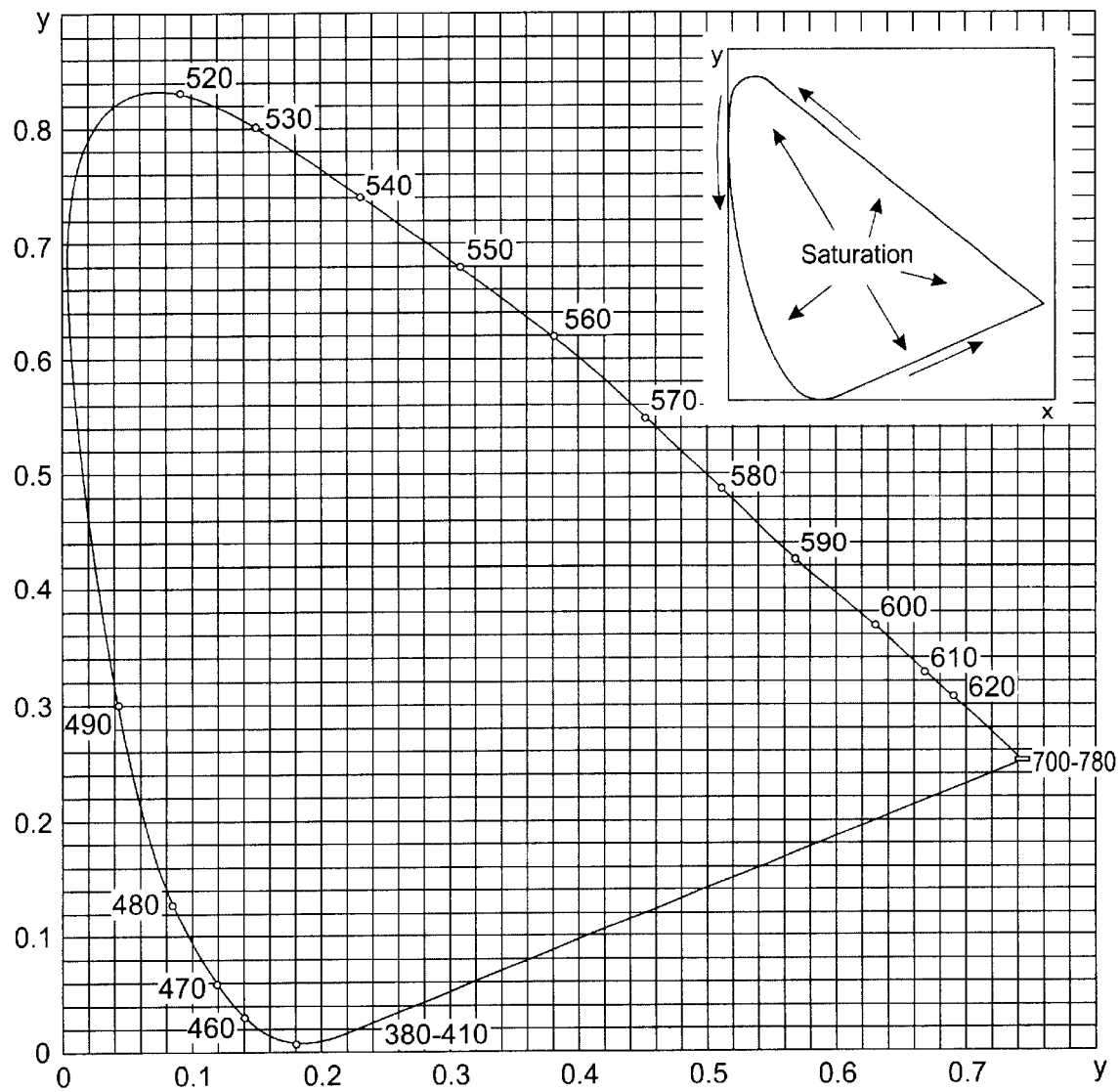
FIG. 3A is an illustration of a Commission Internationale dL'Eclairage ("C.I.E.") chromaticity diagram.
Figure 3B:
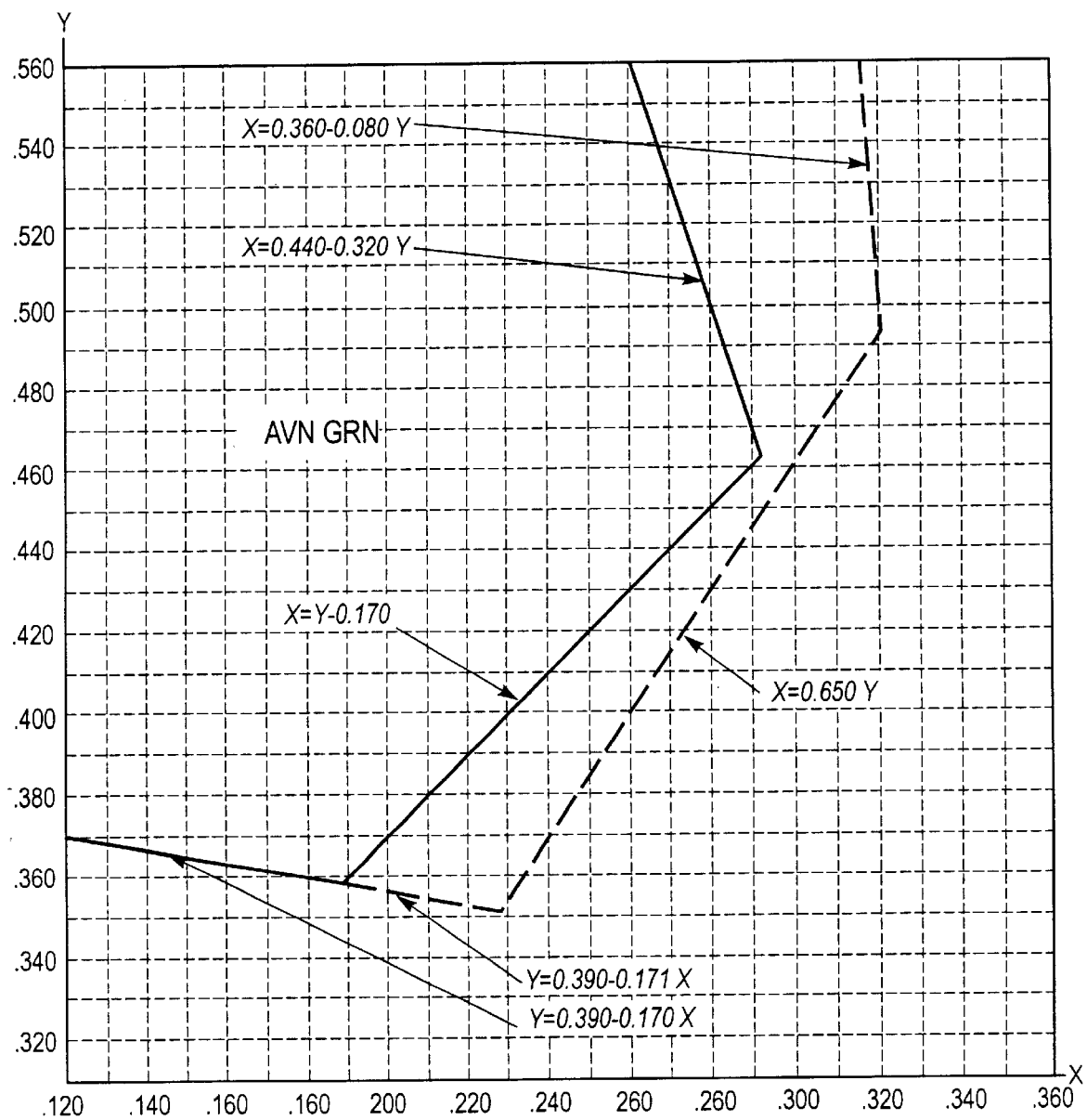
FIG. 3B is an illustration of a detailed section of the chromaticity diagram of FIG. 3A delineating certain aviation green boundaries.
Figure 3C:
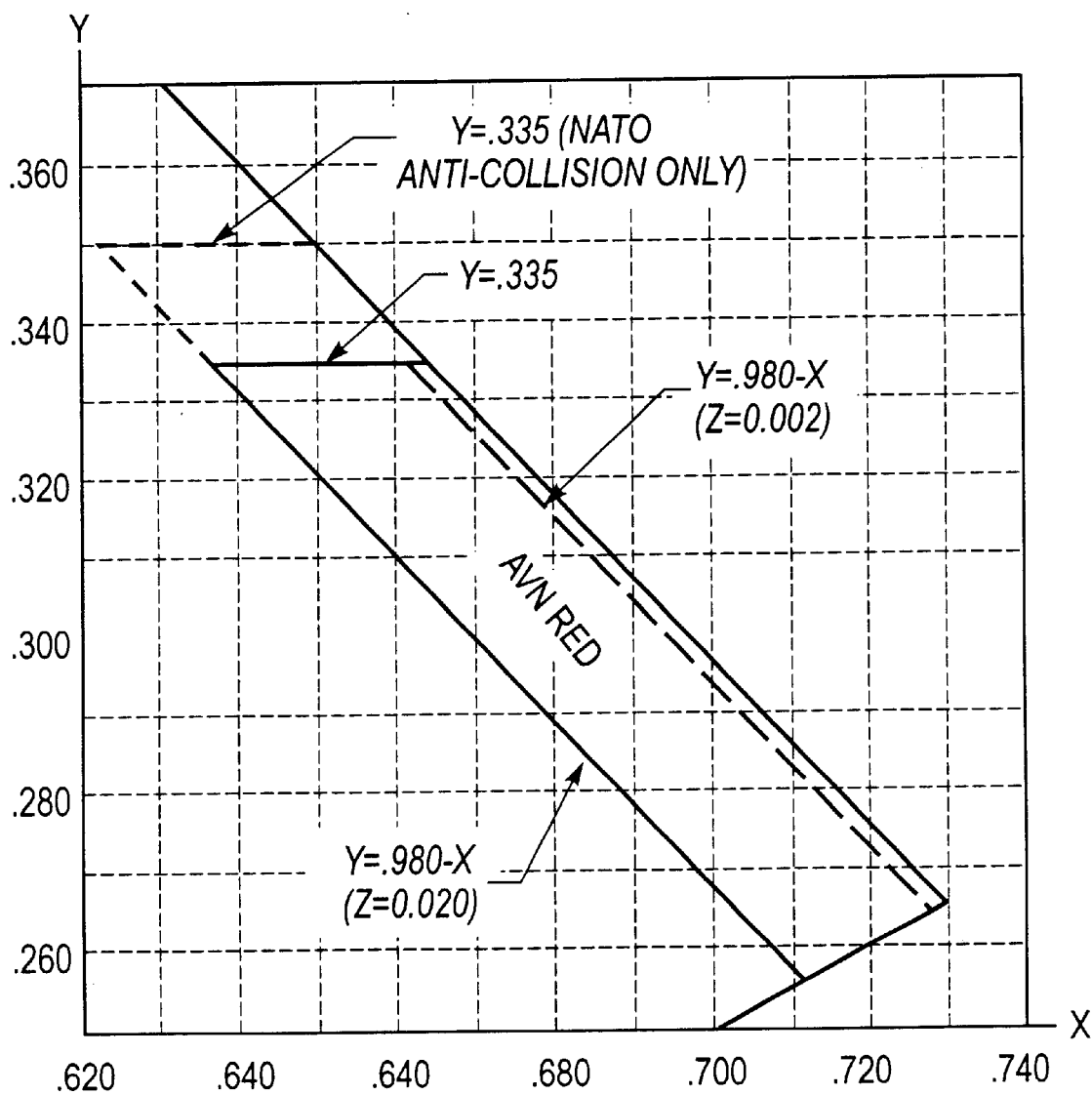
FIG. 3C is an illustration of a detailed section of the chromaticity diagram of FIG. 3A delineating certain aviation red boundaries.

FIG. 3A illustrates an Internationale dL'Eclairage ("C.I.E.") X, Y chromaticity diagram. A chromaticity diagram is a graph of color in two dimensions independent of lightness and is helpful in visualizing color. Within the chromaticity diagram, there are certain boundaries that define the color "aviation green" and the color "aviation red." Those boundaries are illustrated in detail in both graph and formula form in FIGS. 3B (aviation green) and 3C (aviation red) and provide additional color quality design criteria. As noted on the legends of the graphs in FIGS. 3B and 3C, there exists more than one definition of aviation green and red. For the purposes of this application, "Federal Aviation Regulation (FAR) chromaticity requirements" shall mean the following:

| For Aviation Green: | "X" $\leq$ 0.440 − 0.320 "Y" |
| | "X" $\leq$ "Y" − 0.170, and |
| | "Y" $\geq$ 0.390 − 0.170 "X" |
| For Aviation Red: | "Y" $\leq$ 0.335; and |
| | "Z" $\leq$ 0.002 |

Wherein "X", "Y", and "Z" are coordinates on the International Commission on Illumination chromaticity diagram.

The concept of XYZ Tristimulus values, upon which chromaticity diagram are based, is based on the three component theory of color vision, which states that the eye possess receptors for three primary colors red, green and blue and that all colors are seen as mixtures of these three primary colors.

When determining whether emitted light complies with chromaticity requirements, measurements are taken substantially along the horizontal plane (470) and vertical plane (460) between the defined angular ranges (set forth in FIGS. 1B and 2B and presented in Table 1 and 2). When assessing whether the chromaticity of the emitted light complies with defined chromaticity, it is to be understood that unless otherwise specifically stated any measurement taken within the defined angular range that falls within the defined chromaticity requirements shall be considered to "meet" the criteria for that range. Thus, it is contemplated, for example, that a measurement taken in the horizontal plane at 8 degrees which falls within the chromaticity criteria is sufficient to "meet" the chromaticity requirements for the 0 to 10 degree range regardless of whether a measurement taken at 4 degrees falls outside of the chromaticity requirements. It is preferable, however, that all horizontal and vertical plane measurements within a specified angular range fall within the chromaticity requirements. Thus, the term "full compliance" shall, in the context of chromaticity requirements, mean that at no angle within a given horizontal or vertical range shall the emitted light fall outside the confines of the chromaticity requirements.

With these design criteria in mind, we turn to the description of the preferred implementations. FIG. 4A is an illustration of a perspective view of an aircraft 10 depicting a typical positioning of starboard and port side aircraft forward position lights 400 at the leading edge 15 of each wing 50. FIG. 4B is an illustration of a detailed exploded perspective view of the aircraft forward position light 400 depicted in FIG. 4A in accordance with a preferred implementation. FIG. 4B illustrates, in part, a typical existing forward position light housing comprising a socket fixture 410 that mounts to the wing 50 of the aircraft 10, a lens 420 generally shaped in the form of a teardrop that is capable of being secured to the socket fixture 410 via a fastener such as a screw 430, and a power line 440 that electrically connects the socket fixture 410 to a power supply (not shown). FIG. 4B further depicts a preferred implementation of a light emitting diode ("LED") cluster module 450 that is adapted to be connected to the socket fixture 410 and functions as the light source for the aircraft forward position light 400. Also depicted in FIG. 4B are the vertical and horizontal planes 460, 470, respectively, that were previously referred to and discussed above. Vertical and horizontal axis lines 480, 490 of the LED cluster module 450 are also depicted together with a perpendicular axis line 495 of the LED cluster module 450. As illustrated, the perpendicular axis line 495 is generally parallel with the longitudinal axis of the aircraft. FIG. 4C is an illustration of a front or component side view of the assembled aircraft forward position light 400 in accordance with the preferred implementation depicted in FIG. 4B.

Reference will now be made to FIGS. 5A through 5E, which further depict the preferred implementation described above in FIGS. 4A through 4C. FIG. 5A is an illustration of a partially exploded component or front side view of a preferred implementation of an LED cluster module 450. The cluster module 450 is comprised of a base structure 451, multiple LED components 500, resistors 453, a bridge rectifier 454, supporting electrical circuitry 452 (illustrated in FIGS. 5C and 5E), a zener diode 455 that is connected to one (positive lead) of two electrical leads 456, and a base 457 adapted to be electrically and mechanically coupled to the desired socket fixture 410.

The base structure 451 has a distal end 600, a proximate end 605, an upward or top side 610 and a downward or bottom side 615, such that when the LED cluster module 450 is attached to its housing on the aircraft 10, the distal end 600 is furthest from the aircraft relative to the proximate end 605 and the top side 610 is substantially vertically above the bottom side 615. Thus, the component side is facing forward so that its perpendicular axis 495 is generally in a direction parallel to the longitudinal axis of the aircraft 10.

The base structure 451 further comprises a defined surface area, a first portion of which generally located distally on the base structure 451, is dedicated for mounting of the LED components 500. A second portion located proximately on the base structure 451 is generally dedicated to mounting the other electronic components associated with supporting the function of the LED components 500.

The base structure 451 is preferably comprised of a printed circuit board having the supporting electrical circuitry 452 on the rear or solder side of the base structure as illustrated in FIG. 5C and 5E. The electrical circuitry 452 may be created via well-known techniques of etching conductive traces on a dielectric substrate. Alternatively, certain electrical components such as the resistors 453 and bridge rectifier 454, and zener diode 455 may be formed together with the base structure 451 as an integrated chip. A hybrid of the two configurations may also be employed.

The positive electrical lead 456 is connected to the positive contacts 620 of the base 457 and the negative electrical lead 456 is connected to the outer surface of the base 457. As illustrated in FIG. 5B, the positive contacts 620 are electrically shorted with a jumper 625. A sleeve 459 may also be employed to add structural integrity to the module 450; however, it is to be understood that the addition of a sleeve element 459 may require additional space and is not necessary to the implementation. The base 457 may be constructed of nickel or zinc plated brass or any other durable conductive material.

The LED components 500, resistors 453, bridge rectifier 454, and electrical leads 456 are mechanically mounted to the base structure 451 and electrically coupled to the electrical circuitry 452. The mounting can be facilitated via soldering. It may be preferable in order to achieve the desired heat dissipation that the resistors 453 be soldered to the electrical circuitry 452 in manner so that the resistors 453 component be elevated at an ⅛" or more from the surface of the base structure 451.

The base 457 is mechanically connected to the neck of the base structure 451 at its proximate end 605 preferably with a standard thermoset two part epoxy known to those of skill in the art so that the neck of the base structure 451 together with electrical leads 456, the zener diode 455 and bridge rectifier 454 are essentially potted within the cavity of the base 457 with the epoxy. Such a construction provides added structural integrity to the LED cluster module's 450 ability to absorb shock and vibration as well as its ability to resist corrosion.

As depicted in FIG. 5D, which is an illustration of a top side view of the assembled preferred implementation of the LED cluster module 450, the base 457 may be connected to the base structure 451 at a desired angular offset (shown in FIG. 5D as 9°+/−0.5°). Angular configurations, such as that illustrated, may be helpful in meeting design envelope criteria (e.g., existing housing dimensions). The depicted angular configuration is only exemplary of this concept, and it is to be understood that other angular configurations may also be employed.

FIG. 5E is an illustration of a solder or rear side view of the LED cluster module 450 light source absent the sleeve element 459 and without the angular offset.

The LED components 500 are mounted to the electrical circuitry 452 at their defined positions on the base structure 451 via soldering and after which the leads are bent to achieve the required orientation. It is contemplated, however, that the LED components 500 leads could be bent prior to their being mounted to the electrical circuitry 452. To provide added structural integrity to the module 450, it is preferable that the LED components 500 be potted in an epoxy bond suited for such an application such as Dexter Hysol Epoxi-Patch™. The potting may be undertaken subsequent to the mounting and positioning of the LED components 500 and may be achieved via the use of a nozzle with a needle like tip or similar utensil. The surface of the potting material 540 in relation to the LED components 500 and the base structure 451 is depicted in FIGS. 7A through 7E.

Figure 5F:
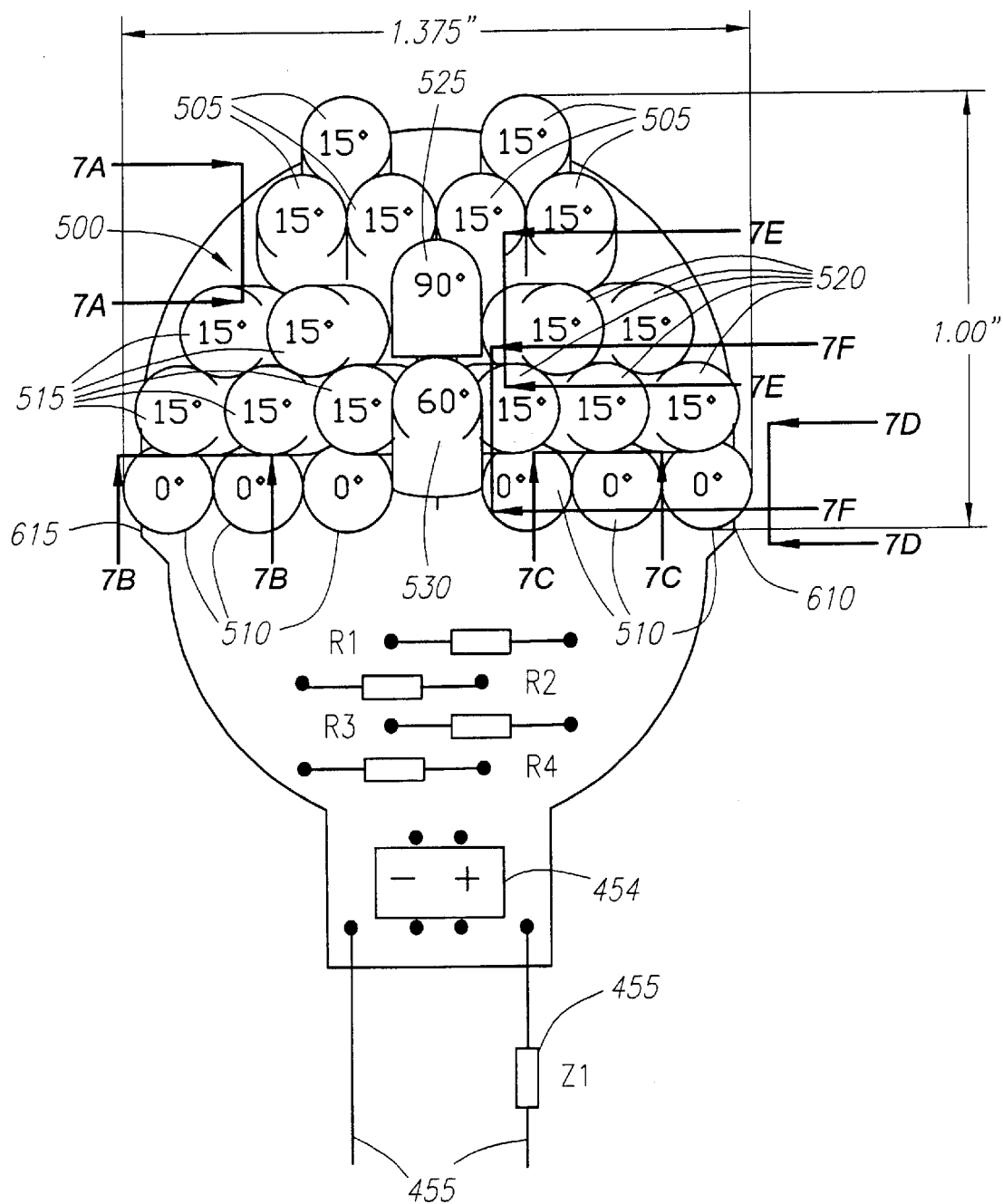
FIG. 5F is a more detailed illustration of the component or front side view of the preferred implementation of the light emitting diode cluster module depicted in FIG. 5A.

We now turn to a discussion of the orientation and configuration of the LED components 500. Generally, it is to be understood that the orientation of the LED components 500 relative to the base structure 451 is determined by the LED component's position on the base structure 451 and the relative position of the base structure 451 to the aircraft 10. FIG. 5F is a more detailed illustration of the component or front side view of the preferred implementation of the LED cluster module 450 depicted in FIG. 5A. As illustrated in FIG. 5F, there are six sets of differently oriented LED components 500 generally configured in five parallel rows. The number and orientation of the sets together with the number of LED components 500 contained within each set are subject to design criteria, such as the candela and chromaticity requirements and defined design envelopes (e.g., power or voltage requirements, housing dimensions, etc.).

Figure 7A:
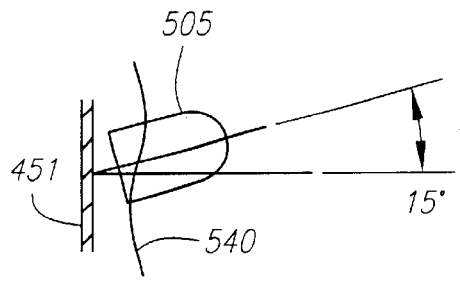
FIG. 7A is a detailed illustration of a bottom side view of an exemplary LED component of a first set of LED components in relation to the printed circuit board to which it is connected in accordance with the preferred implementations depicted in FIG. 5F and FIG. 6C.

The first set is comprised of five LED components 500 located in the distal two rows of LED components 500 and are called out in FIG. 5F as reference numeral 505. They are angled distally (outwardly from the fuselage of the aircraft in a direction generally parallel to the horizontal axis 490) at approximately 15 degrees from normal. "Normal" is defined for the purpose of this application with respect to LED component orientation as parallel with a perpendicular axis line 495 of the LED cluster module 450 and the longitudinal axis of the aircraft 10. Thus, for example, an LED component that is angled distally at 15 degrees relative to normal has a center line of emitted light that is oriented outwardly from the fuselage of the aircraft in a direction generally parallel to the horizontal axis at a 15 degree angle relative to the longitudinal axis of the aircraft. FIG. 7A is a detailed illustration of a bottom side view (as illustrated in FIG. 5F) of an exemplary LED component 505 in relation to the base structure 451 to which it is connected.

Figure 7E:
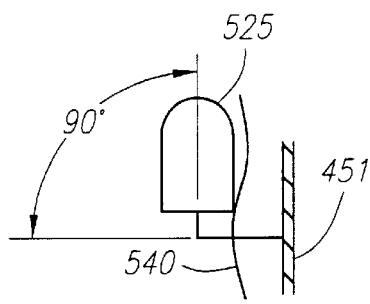
FIG. 7E is a detailed illustration of a top side view of an LED component of a fifth set in relation to the printed circuit board to which it is connected in accordance with the preferred implementations depicted in FIG. 5F and FIG. 6C.
Figure 7B:
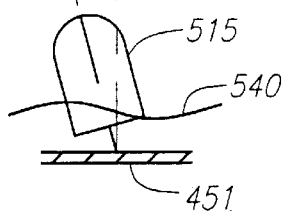
FIG. 7B is a detailed illustration of a proximate side view of an exemplary LED component of a third set of LED components in relation to the printed circuit board to which it is connected in accordance with the preferred implementations depicted in FIG. 5F and FIG. 6C.
Figure 7F:
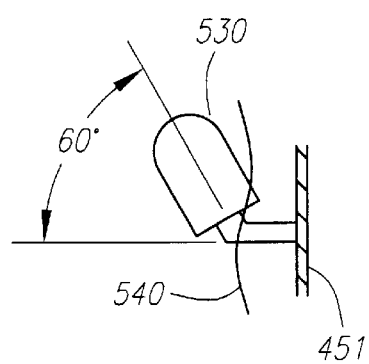
FIG. 7F is a detailed illustration of a top side view of an LED component of a sixth set in relation to the printed circuit board to which it is connected in accordance with the preferred implementations depicted in FIG. 5F and FIG. 6C.
Figure 7C:
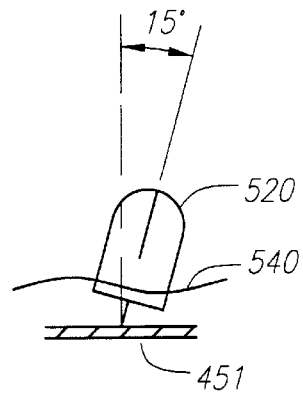
FIG. 7C is a detailed illustration of a proximate side view of an exemplary LED component of a fourth set of LED components in relation to the printed circuit board to which it is connected in accordance with the preferred implementations depicted in FIG. 5F and FIG. 6C.
Figure 7D:
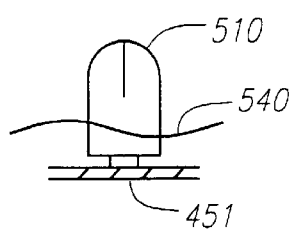
FIG. 7D is a detailed illustration of a side view of an exemplary LED component of a second set of LED components in relation to the printed circuit board to which it is connected in accordance with the preferred implementations depicted in FIG. 5F and FIG. 6C.

The second set is comprised of six LED components located in the proximate most row of LED components 500 and are called out in FIG. 5F as reference numeral 510. They are positioned substantially normal (0 degrees) so that they are substantially parallel in orientation with a perpendicular axis line 495 of the LED cluster module 450 and the longitudinal axis of the aircraft 10. FIG. 7D is a detailed illustration of a side view (as illustrated in FIG. 5F) of an exemplary LED component 510 in relation to the base structure 451 to which it is connected.

The third set, similarly to first set, is comprised of five LED components 500 located in the bottom portion of the middle two rows of LED components 500 and are proximate in relative location to the distal two rows containing LED components 505 and distal in relative location to the proximate most row containing LED components 510. They are generally called out in FIG. 5F as reference numeral 515. They are angled toward the bottom side 615 (downward from the wing generally in a direction parallel with the vertical axis 480) at approximately 15 degrees from normal. FIG. 7B is a detailed illustration of a proximate side view (as illustrated in FIG. 5F) of an exemplary LED component 515 in relation to the base structure 451 to which it is connected.

Similarly, the fourth set is comprised of five LED components 500 located in the top portion of the middle two rows of LED components 500 proximate in relative location to the distal two rows containing LED components 505 and distal in relative location to the proximate most row containing LED components 510. They are called out in FIG. 5F as reference numeral 520. They are angled toward the upper top side 610 (upward from the wing generally in a direction parallel with the vertical axis 480) at approximately 15 degrees from normal. FIG. 7C is a detailed illustration of a proximate side view (as illustrated in FIG. 5F) of an exemplary LED component 515 in relation to the base structure 451 to which it is connected.

The fifth set is comprised of a single LED component 500 located generally centrally between the other five sets and is called out in FIG. 5F as reference numeral 525. It is angled distally approximately 90 degrees from normal. FIG. 7E is a detailed illustration of a top side view (as illustrated in FIG. 5F) of the LED component 525 in relation to the base structure 451 to which it is connected. As depicted in FIG. 7E, the electrical leads of the LED component 525 are dimensioned somewhat longer than the preceding four sets of LED components 500 so that once bent to the 90 degree angular orientation the LED component's 525 is elevated relative to the first set of LED components 505. Thus the LED component 525 when positioned is elevated to some degree over the top surfaces of the of the first set LED components 505, and thus any obstruction of the light emitted by the LED component 525 is limited.

The sixth set is similar to the fifth set in that it is preferably comprised of a single LED component 500. It is located substantially proximate to the LED component 525 of the fifth set and is called out in FIG. 5F as reference numeral 530. It is angled distally approximately 60 degrees from normal. FIG. 7F is a detailed illustration of a top side view (as illustrated in FIG. 5F) of the LED component 530 in relation to the base structure 451 to which it is connected. As depicted in FIG. 7F in similar fashion to the LED component 525, the leads of the LED component 530 are dimensioned somewhat longer than the leads in sets one through four such that when bent to the 60 degree angular distal orientation the LED component's 530 is in relative elevation. Thus, the domed surface (the surface of the LED component that is generally perpendicular to the direction of the emitted light) of the LED component 530 is substantially unobstructed by the bottom surface of the LED component 525.

It is to be understood, however, that the orientations of the LED components 500 may be varied from that described in the above preferred implementations. In particular, the first, third and fourth sets of LED components (505, 515, and 520) may be oriented at a range of between 0 and 90 degrees from normal, preferably between 5 and 60 degrees from normal, even more preferably between 10 and 30 degrees from normal, yet more preferably between 10 and 20 degrees from normal, yet more preferably between 12.5 and 17.5 degrees from normal, and yet more preferably at substantially 15 degrees from normal.

With respect to second LED component set 510, the LED components may be oriented at a range between 0 and +/−45 degrees relative to normal, preferably between 0 and +/−35 degrees relative to normal, more preferably between 0 and +/−25 relative to normal, even more preferably between 0 and +/−15 degrees relative to normal, yet more preferably between 0 and +/−10 degrees relative to normal, yet more preferably between 0 and +/−5 degrees relative to normal and yet more preferably at substantially 0 degrees from normal.

With respect to fifth LED component set 525, the LED component(s) may be oriented at a range between 0 and 130 degrees relative to normal, preferably between 15 and 125 degrees relative to normal, more preferably at a range between 30 and 120 degrees relative to normal, even more preferably at a range between 45 and 115 degrees relative to normal, yet more preferably at a range between 60 and 110 degrees relative to normal, yet more preferably at a range between 75 and 100 degrees relative to normal, yet more preferably at a range between 85 and 95 degrees relative to normal, yet more preferably between 87.5 and 92.5 relative to normal, and yet more preferably at substantially 90 degrees relative to normal.

With respect to sixth LED component set 530, the LED component(s) may be oriented at a range between 0 and 120 degrees relative to normal, preferably between 10 and 110 degrees relative to normal, more preferably between 20 and 100 degrees relative to normal, yet more preferably at a range between 30 and 90 degrees relative to normal, yet more preferably at a range between 40 and 80 degrees relative to normal, yet more preferably at a range between 50 and 70 degrees relative to normal, yet more preferably at a range between 55 and 65 degrees relative to normal, yet more preferably between 57.5 and 62.5 relative to normal, and most preferably at substantially 60 degrees relative to normal.

The term "substantially" in the context of LED component orientations previously described shall mean the reference angle plus or minus five degrees.

It is to be understood that while the LED components 500 are depicted as being mounted on a single side of the base structure 451 it is contemplated that other mounting configurations may be potentially be employed. For example, one or more LED components 500 may be mounted on the rear or solder side of the base structure 451.

Figure 6A:
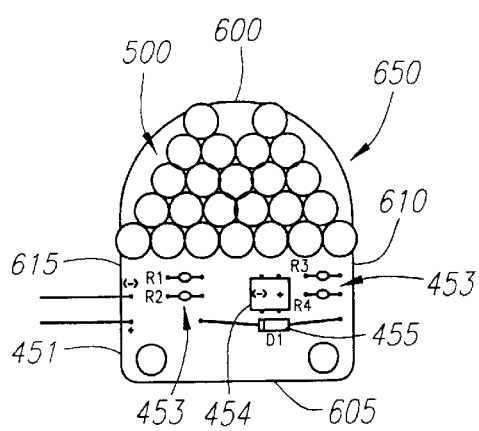
FIG. 6A is an illustration of a component or front side view of another preferred implementation of a light emitting diode cluster module in accordance with the present invention.
Figure 6B:
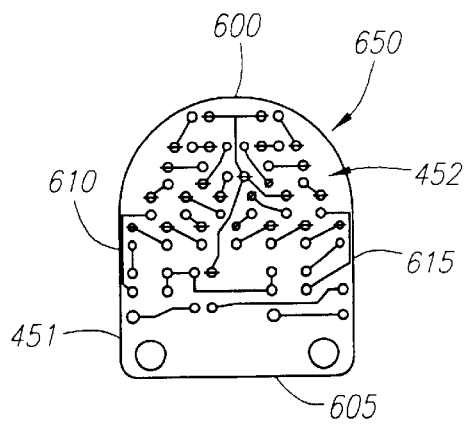
FIG. 6B is an illustration of a solder or rear side view of the preferred implementation of a light emitting diode cluster module depicted in FIG. 6A.
Figure 6C:
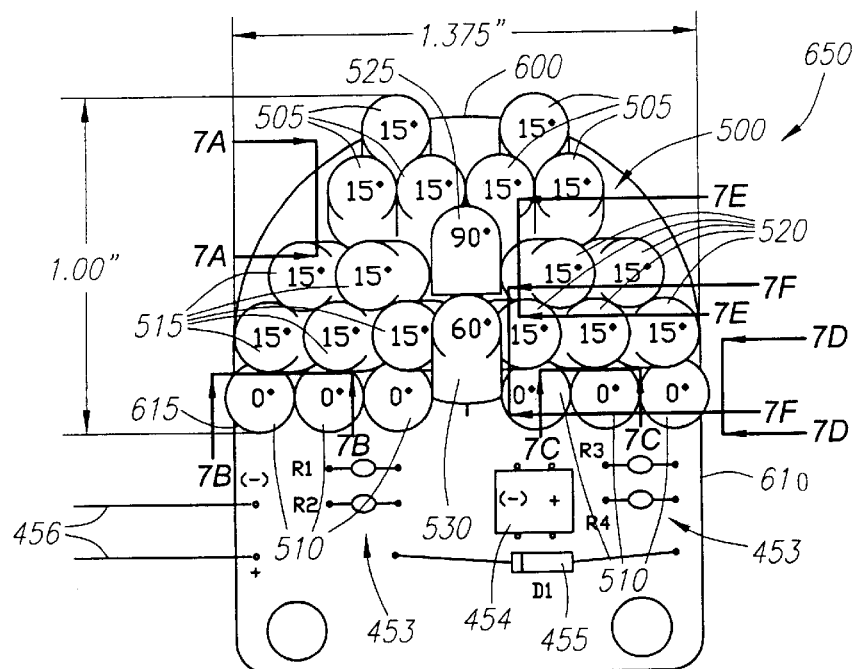
FIG. 6C is a more detailed illustration of the component or front side view of the preferred implementation of the light emitting diode cluster module depicted in FIG. 6A.

FIGS. 6A through 6C illustrate a second preferred implementation of an LED cluster module 650. The second preferred implementation differs from the first preferred implementation primarily in the geometry of the base structure 451 and the location of the zener diode 455, the resistors 453, the bridge rectifier 454 and the module's electrical leads 456 in relation to the base structure 451. It is designed to be secured at the corners of its proximate end 605 to the housing with fasteners such as screws (not shown) as opposed to a base 457 and socket 410 configuration of the first implementation. The position, orientation and relative configuration of the LED components 500 are essentially the same as that of the first preferred implementation and therefore will not be discussed further.

Figure 8:
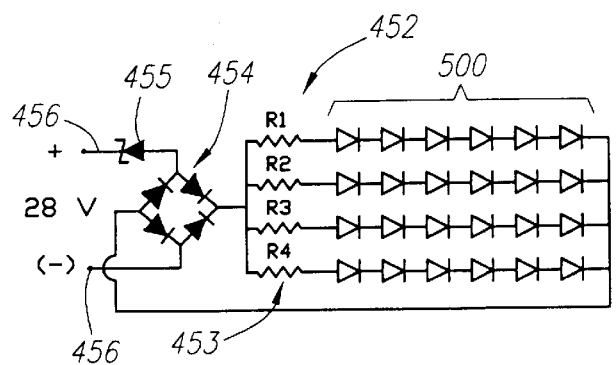
FIG. 8 is an electrical diagram of the light emitting diode cluster light source in accordance with the preferred implementations depicted in FIGS. 5, 6 and 7.

We turn now to a more detailed description of the previously referred to electrical components and circuitry 452. FIG. 8 is an electrical diagram in accordance with the preferred implementations depicted in FIGS. 5, 6 and 7. As illustrated in FIG. 8, there exist four parallel circuits each having six LEDs connected in series to a single resistor 453; the four parallel circuits are electrically connected to the power supply via the bridge rectifier 454 and zener diode 455. As a result, if any one LED should fail, all the LEDs in that series would also fail. However, the remaining thriving series would still emit light and as such an all-out failure of the light source may substantially be reduced. Moreover, such a design is conducive to detection and replacement of the LED cluster module prior to the light source completely failing.

For a starboard side (green) aircraft forward position light source powered by a standard 28-volt power supply, the preferred implementations depicted and described above may be achieved by use of the following electronic components:

Zener Diode (455): 3.3-volt forward voltage draw and a 5 watt rating.

Bridge Rectifier (454): 1.4-volt forward voltage draw.

LED (Green) (500): The LED component is preferably comprised of an LED chip being made from InGaNi (Indium-Galium-Nitride) and emitting light at approximately 525 nm (nanometers), which is encased within a standard 5 mm diameter thermoset "clear water" epoxy measuring approximately 9 mm high from the tip of the encasing's domed surface to the encasing's bottom surface, such that light is emitted with a 15-degree conical beam spread. The LED component preferably having a 3.78 voltage forward draw and a 15 mAmp nominal forward current.

Resistors (453): 110Ω (ohms) and a 0.25 watt ratting.

Accordingly, the current and power for the circuit configuration illustrated in FIG. 8 would be defined as follows:

$$\text{Current} = 15 \, \text{mAmps}$$
$$= \frac{(28\,\text{V} - 3.3\,\text{V}) - [(1.4\,\text{V}/4) + (3.78\,\text{Vf})(6)]}{110\,\Omega};$$

Power=0.420 Watts =28 Volts ×0.015 Amps

The above described implementations are presently understood to "meet" and are believed to be in "full compliance" with the candela output criteria set forth in FIGS. 2 and 3 and in Tables 1 and 2 as well as the "Federal Aviation Regulation chromaticity requirements" also defined above. Accordingly, they are likely to be suitable as light sources for aircraft forward position lights.

Furthermore, the above implementations in addition to being capable of being powered by a 28 volt power supply are also capable of meeting additional dimensional design criteria. In particular the LED components are capable of being configured to fall within a defined area of approximately 1.375 inches by 1.000 inches. These dimensions are illustrated in FIGS. 5F and 6C. Thus, the above implementations are presently understood to fall within the confines of strict dimensional criteria of the known aircraft forward position light housings. Accordingly, it presently understood that the preferred implementations are capable of being suitably adapted as replacement light sources for a wide range of existing aircraft forward position light housing configurations.

It is to be understood that the orientations, position, and number of the LED components are a function of the various design criteria, including the design envelop dimensions, the candela output criteria at various horizontal and vertical angles, the desired chromaticity, the power source characteristics, the desired power usage of the device, and the electrical characteristics of the LED components including their efficiency to convert power to light, their luminescence (i.e., candela output) and their light beam spread characteristics. These criteria would also be taken into consideration when choosing or designing the other electronic components, such as resistors 453, bridge rectifier 454, zener diode 455, and the electrical circuitry 452.

The LED cluster modules described above have potentially many advantageous qualities when compared to incandescent light sources. For example the LED modules described above are presently understood or expected to manifest a life expectancy of 100,000 operational hours. Consequently, a reduction of the associated costs relating to maintenance and replacement may be realized. In addition, the LEDs employed in the above-preferred implementations are monochromatic in that they emit light in a very narrow range of wavelengths. This is because the wavelength of the emitted light is a function of the material composition of the LED employed. As such, wasted energy would substantially belimited if not completely eliminated. Furthermore, there would be no need to employ a colored lens or a filtering device to achieve the desired color quality. In addition, a reduction in undesirable heat emission to the surrounding components may be realized.

While there has been illustrated and described what are at present considered to be preferred implementations, features and methods of the present invention, it will be understood by those skilled in the art that various changes and modifications may be made, and equivalents may be substituted for elements thereof without departing from the scope of the invention.

In addition, many modifications may be made to adapt a particular, element, feature or implementation to the teachings of the present invention without departing from the central scope of the invention. Therefore, it is intended that this invention not be limited to the particular implementations and methods disclosed herein, but that the invention include all implementations falling within the scope of the appended claims.

What is claimed is:

1. An aircraft forward position light source comprising:
a base structure;
multiple LED components mounted on the base structure, and adapted so that, when powered, the LED components emit light that meets the candela output design criteria defined in Table 1 and Table 2 and the Federal Aviation chromaticity requirements for the light source;

wherein Table 1 is:

TABLE 1

Candela Output Design Criteria in the Horizontal Plane

| Dihedral Angle | Minimum Candela (cd) |
|---|---|
| 0 to 10 degrees | 40 cd |
| 10 to 20 degrees | 30 cd |
| 10 to 110 degrees | 5 cd | wherein Table 2 is:

TABLE 2

Candela Output Design Criteria in the Vertical Plane

| Angle Above and Below the Horizontal Plane | Minimum Candela (cd) |
|---|---|
| 0 degrees | 40 cd |
| 1 to 5 degrees | 36 cd |
| 6 to 10 degrees | 32 cd |
| 11 to 15 degrees | 28 cd |
| 16 to 20 degrees | 20 cd |
| 21 to 30 degrees | 12 cd |
| 31 to 40 degrees | 4 cd |
| 41 to 90 degrees | 2 cd | and, wherein the multiple LED components are comprised of multiple sets of LED components including a first set of LED components at a first defined angle distally relative to normal, a second set of LED components at a oriented substantially normal, a third set of LED components at a third defined angle downwardly relative to normal, and a fourth set of LED components at a fourth defined angle upwardly relative to normal.

2. The light source of claim 1, wherein there is one or more LED components within each set of LED components.

3. The light source of claim 1, wherein the LED components are electrically configured into multiple groups of LED components connected in parallel and the LED components within a group being connected in series.

4. The light source of claim 3, wherein there are at least three groups of LED components connected in parallel.

5. The light source of claim 3, wherein there are at least four groups of LED components connected in parallel.

6. The light source of claim 1, wherein at least one of the first, third, or fourth defined angle is between 5 and 60 degrees.

7. The light source of claim 6, wherein at least one of the first, third, or fourth defined angle is between 10 and 30 degrees.

8. The light source of claim 7, wherein at least one of the first, third, or fourth defined angle is between 10 and 20 degrees.

9. The light source of claim 8, wherein at least one of the first, third, or fourth defined angle is at substantially 15 degrees.

10. The light source of claim 9, wherein at least one of the first, third, or fourth defined angle is at 15 degrees.

11. The light source of claim 1, wherein at least two of the first, third, or fourth defined angle are between 5 and 60 degrees.

12. The light source of claim 11, wherein at least two of the first, third, or fourth defined angle are between 10 and 30 degrees.

13. The light source of claim 12, wherein at least two of the first, third, or fourth defined angle are between 10 and 20 degrees.

14. The light source of claim 13, wherein at least two of the first, third, or fourth defined angle are at substantially 15 degrees.

15. The light source of claim 14, wherein at least two of the first, third, or fourth defined angle are at 15 degrees.

16. The light source of claim 1, wherein the first, third, and fourth defined angle are between 5 and 60 degrees.

17. The light source of claim 16, wherein the first, third, and fourth defined angle are between 10 and 30 degrees.

18. The light source of claim 17, wherein the first, third, and fourth defined angle are between 10 and 20 degrees.

19. The light source of claim 18, wherein the first, third, and fourth defined angle are at substantially 15 degrees.

20. The light source of claim 19, wherein the first, third, and fourth defined angle are at 15 degrees.

21. The lights source of claim 6 further comprising a fifth set of LED components oriented at a fifth defined angle distally relative to normal at between 15 and 125 degrees.

22. The light source of claim 7 further comprising a fifth set of LED components oriented at a fifth defined angle distally relative to normal at between 45 and 115 degrees.

23. The light source of claim 8 further comprising a fifth set of LED components oriented at a fifth defined angle distally relative to normal at between 75 and 100 degrees.

24. The light source of claim 9 further comprising a fifth set of LED components oriented at a fifth defined angle distally relative to normal at substantially 90 degrees.

25. The light source of claim 10 further comprising a fifth set of LED components oriented at a fifth defined angle distally relative to normal at 90 degrees.

26. The lights source of claim 11 further comprising a fifth set of LED components oriented at a fifth defined angle distally relative to normal at between 15 and 125 degrees.

27. The light source of claim 12 further comprising a fifth set of LED components oriented at a fifth defined angle distally relative to normal at between 45 and 115 degrees.

28. The light source of claim 13 further comprising a fifth set of LED components oriented at a fifth defined angle distally relative to normal at between 75 and 100 degrees.

29. The light source of claim 14 further comprising a fifth set of LED components oriented at a fifth defined angle distally relative to normal at substantially 90 degrees.

30. The light source of claim 15 further comprising a fifth set of LED components oriented at a fifth defined angle distally relative to normal at 90 degrees.

31. The lights source of claim 16 further comprising a fifth set of LED components oriented at a fifth defined angle distally relative to normal at between 15 and 125 degrees.

32. The light source of claim 17 further comprising a fifth set of LED components oriented at a fifth defined angle distally relative to normal at between 45 and 115 degrees.

33. The light source of claim 18 further comprising a fifth set of LED components oriented at a fifth defined angle distally relative to normal at between 75 and 100 degrees.

34. The light source of claim 19 further comprising a fifth set of LED components oriented at a fifth defined angle distally relative to normal at substantially 90 degrees.

35. The light source of claim 20 further comprising a fifth set of LED components oriented at a fifth defined angle distally relative to normal at 90 degrees.

36. The lights source of claim 6 further comprising a fifth set of LED components oriented at a fifth defined angle distally relative to normal at between 15 and 125 degrees and further comprising a sixth set of LED components oriented at a sixth defined angle distally relative to normal at between 10 and 110 degrees.

37. The light source of claim 7 further comprising a fifth set of LED components oriented at a fifth defined angle distally relative to normal at between 45 and 115 degrees and further comprising a sixth set of LED components oriented at a sixth defined angle distally relative to normal at between 30 and 90 degrees.

38. The light source of claim 8 further comprising a fifth set of LED components oriented at a fifth defined angle distally relative to normal at between 75 and 100 degrees and further comprising a sixth set of LED components oriented at a sixth defined angle distally relative to normal at between 50 and 70 degrees.

39. The light source of claim 9 further comprising a fifth set of LED components oriented at a fifth defined angle distally relative to normal at substantially 90 degrees and further comprising a sixth set of LED components oriented at a sixth defined angle distally relative to normal at substantially 60 degrees.

40. The light source of claim 10 further comprising a fifth set of LED components oriented at a fifth defined angle distally relative to normal at 90 degrees and further comprising a sixth set of LED components oriented at a sixth defined angle distally relative to normal at 60 degrees.

41. The lights source of claim 11 further comprising a fifth set of LED components oriented at a fifth defined angle distally relative to normal at between 15 and 125 degrees and further comprising a sixth set of LED components oriented at a sixth defined angle distally relative to normal at between 10 and 110 degrees.

42. The light source of claim 12 further comprising a fifth set of LED components oriented at a fifth defined angle distally relative to normal at between 45 and 115 degrees and further comprising a sixth set of LED components oriented at a sixth defined angle distally relative to normal at between 30 and 90 degrees.

43. The light source of claim 13 further comprising a fifth set of LED components oriented at a fifth defined angle distally relative to normal at between 75 and 100 degrees and further comprising a sixth set of LED components oriented at a sixth defined angle distally relative to normal at between 50 and 70 degrees.

44. The light source of claim 14 further comprising a fifth set of LED components oriented at a fifth defined angle distally relative to normal at substantially 90 degrees and further comprising a sixth set of LED components oriented at a sixth defined angle distally relative to normal at substantially 60 degrees.

45. The light source of claim 15 further comprising a fifth set of LED components oriented at a fifth defined angle distally relative to normal at 90 degrees and further comprising a sixth set of LED components oriented at a sixth defined angle distally relative to normal at 60 degrees.

46. The light source of claim 16 further comprising a fifth set of LED components oriented at a fifth defined angle distally relative to normal at between 15 and 125 degrees and further comprising a sixth set of LED components oriented at a sixth defined angle distally relative to normal at between 10 and 110 degrees.

47. The light source of claim 17 further comprising a fifth set of LED components oriented at a fifth defined angle distally relative to normal at between 45 and 115 degrees and further comprising a sixth set of LED components oriented at a sixth defined angle distally relative to normal at between 30 and 90 degrees.

48. The light source of claim 18 further comprising a fifth set of LED components oriented at a fifth defined angle distally relative to normal at between 75 and 100 degrees and further comprising a sixth set of LED components oriented at a sixth defined angle distally relative to normal at between 50 and 70 degrees.

49. The light source of claim 19 further comprising a fifth set of LED components oriented at a fifth defined angle distally relative to normal at substantially 90 degrees and further comprising a sixth set of LED components oriented at a sixth defined angle distally relative to normal at substantially 60 degrees.

50. The light source of claim 20 further comprising a fifth set of LED components oriented at a fifth defined angle distally relative to normal at 90 degrees and further comprising a sixth set of LED components oriented at a sixth defined angle distally relative to normal at 60 degrees.

51. An aircraft forward position light source comprising:
a base structure;
electrical circuitry adapted to be connected to a power supply;
at least four sets of LED components mounted on the base structure and in electrical communication with the electrical circuitry with a first LED component set being oriented at a first defined angle distally relative to normal, a second LED component set being oriented substantially to normal, a third LED component set being oriented at a third defined angle downwardly relative to normal, and a fourth LED component set being oriented at a fourth defined angle upwardly relative to normal such that, when powered, the LED components emit light that meets the candela output design criteria defined in Table 1 and Table 2;
wherein Table 1 is:

TABLE 1

Candela Output Design Criteria in the Horizontal Plane

| Dihedral Angle | Minimum Candela (cd) |
|---|---|
| 0 to 10 degrees | 40 cd |
| 10 to 20 degrees | 30 cd |
| 20 to 110 degrees | 5 cd | and, wherein Table 2 is:

TABLE 2

Candela Output Design Criteria in the Vertical Plane

| Angle Above and Below the Horizontal Plane | Minimum Candela (cd) |
|---|---|
| 0 degrees | 40 cd |
| 0 to 5 degrees | 36 cd |
| 5 to 10 degrees | 32 cd |
| 10 to 15 degrees | 28 cd |
| 15 to 20 degrees | 20 cd |
| 20 to 30 degrees | 12 cd |
| 30 to 40 degrees | 4 cd |
| 40 to 90 degrees | 2 cd |

52. The light source of claim 51 wherein the LED components are adapted so that, when powered, emit light that meets the Federal Aviation chromaticity requirements for the light source.

53. The light source of claim 51 wherein the LED components being adapted so that, when powered, emit light that meets the Federal Aviation chromaticity requirements for a starboard side aviation green light source.

54. The light source of claim 51, 52, or 53 wherein at least one of the LED components are potted on the surface of the base structure in a suitable potting material.

55. The light source of claim 51, 52, or 53 wherein the light source is adapted to being powered by a 28-volt power supply.

56. The light source of claim 51, 52, or 53 wherein the light source is adapted as a replacement light source for existing aircraft forward position light housings.

57. The light source of claim 56 further comprising a base adapted to be electrically and mechanically coupled to a socket fixture.

58. The light source of claim 57 wherein the base structure is potted in a suitable material within a cavity of the base.

59. The light source of claim 51, 52, or 53 wherein the LED components are configured to fall within the confines of a defined area overlying the surface of the base structure of approximately 2.75 inches by 2.00 inches.

60. The light source of claim 59 wherein the defined area is 2.07 inches by 1.5 inches.

61. The light source of claim 60 wherein the defined area is 1.375 inches by 1.00 inches.

62. The light source of claim 51, 52, or 53, wherein the LED components are adapted so that, when powered, emit light that is in full compliance with the candela output design criteria defined in Table 1 and Table 2.

63. The light source of claim 52 or 53 wherein the LED components are adapted so that, when powered, emit light that is in full compliance with the Federal Aviation chromaticity requirements for the light source.

64. The light source of claim 51, 52, or 53 wherein the first set of LED components is positioned generally distal in relation to the second, third and fourth set of LED components.

65. The light source of claim 64 wherein the third and fourth set of LED components is positioned generally distal to the second set of LED components.

66. The light source of claim 51, 52, or 53 further comprising a fifth set of LED components being oriented generally distal relative to normal and a sixth set of LED components being oriented generally distal relative to normal, wherein the fifth set of LED components is located distally relative to the sixth set of LED components.

67. The light source of claim 66 wherein the first set, second set, third set, fourth set, fifth set, and sixth set of LED components are each comprised of one or more LED components.

68. The light source of claim 67 wherein the fifth set and sixth set of LED components are each comprised of a single LED component.

69. The light source of claim 68, the first set of LED components being oriented at substantially 15 degrees distal relative to normal, the second set of LED components being oriented at substantially normal, the third set of LED components being oriented at substantially 15 degrees downwardly relative to normal, the fourth set of LED components being oriented at substantially 15 degrees upwardly relative to normal, the fifth set of LED components being oriented at substantially 90 degrees distal relative to normal, and the sixth set of LED components being oriented at substantially 60 degrees distal relative to normal.

* * * * *